UNITED STATES PATENT OFFICE.

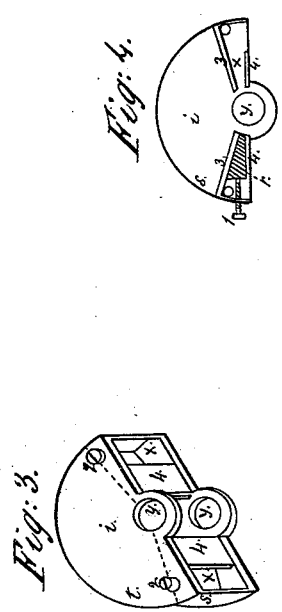
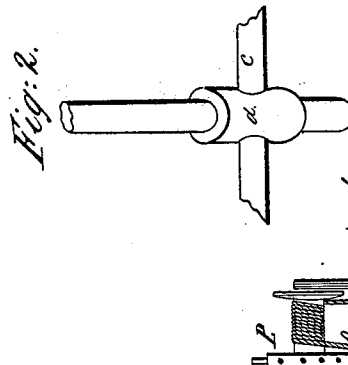

ROBERT H. LECKY, OF McCLURE, PENNSYLVANIA.

IMPROVED PROPELLING AND STEERING APPARATUS.

Specification forming part of Letters Patent No. 39,936, dated September 15, 1863.

*To all whom it may concern:*

Be it known that I, ROBERT H. LECKY, of McClure township, in the county of Allegheny and State of Pennsylvania, have invented a new and useful Improvement for Propelling and Steering Vessels; and I do hereby declare that the following is a full and exact description thereof, reference being had to the accompanying drawings, and to the letters of reference marked thereon.

The nature of my invention consists in a combination and arrangement of the driving-gear of the propeller with the tiller-wheel and tiller-ropes of the vessel, the whole being combined and arranged so that the propeller-wheel is entirely under the control of the helmsman or pilot, and so that it will perform the part of propeller and rudder.

To enable others skilled in the art to make and use my invention, I will proceed to describe its construction and operation.

In the accompanying drawings, Figure 1 represents a longitudinal and vertical section of the vessel, propeller, driving-gear, tiller-wheel, and tiller-ropes. Fig. 2 represents a sectional view of the shaft to which the propeller is attached, and also the shaft which supports it. Fig. 3 represents the packing-box of the perpendicular shaft $d$. Fig. 4 represents a section of the packing-box.

In the accompanying drawings, $a$ represents the vessel. $b$ represents the propeller-wheel, which is attached to the shaft $c$, which passes through and has its bearing in the large part of the perpendicular shaft $d$, (see Fig. 2,) which is made water-tight by means of the packing-box $i$ and the ring or box $e$.

The packing-box $i$ consists of two plates, $s$ and $t$, which are held together by bolts. (Marked 2.) The plate $s$ is furnished with two sets of flanges, 3 and 4, which form the packing-chambers $x$, in which is placed a metallic packing, which is forced to its place in the chamber and against the shaft $d$ by means of a set-screw, 1. (See Figs. 3 and 4.)

The openings $y$ in the plates $s$ and $t$ are for the shaft $d$.

In Fig. 4 one of the packing-chambers is represented with the packing in it, and the other without packing.

$r$ represents the packing.

On shaft $c$ is placed a wheel, $g$, which gears into a janus-faced wheel, $h$, on the shaft $d$.

$j$ represents the driving-wheel, which also gears into the wheel $h$.

The crank $l$, to which the driving power is applied, is placed on the shaft $u$, which is held in position by the cross-bar $k$. On the end of the shaft $c$ is placed a head-block, $n$, in which revolves the end of the shaft $c$. To the head-blocks are attached the tiller-ropes $m$ and $o$.

P represents the tiller-wheel, which is of ordinary construction.

It will be observed that by this combination and arrangement of the various parts I place the driving-gear of the propeller inside of the vessel, and prevent any leakage around the shafts by means of the packing-box $i$ and the ring $e$.

The operation of my improvement is as follows: Having all things arranged, combined, and constructed as described and represented, I apply the power to the crank $l$, which will revolve the wheel $j$, which will revolve the wheel $h$, which will revolve the wheel $g$, and thereby revolve the shaft $c$, which revolves the propeller $b$. To turn or guide the vessel in the desired direction, the tiller-wheel is turned so as to give the propeller-wheel the desired angle to the vessel—that is to say, by turning the tiller-wheel the tiller-ropes will draw the end of the shaft $c$ sidewise to the right or left of the vessel, which will give the desired position to the propeller for controlling and propelling the vessel any way desired.

It will be observed that in changing the position of the shaft $c$ that the shaft $d$ will turn with it, and also that wheel $h$ turns on the shaft $d$.

Having thus described the nature, construction, and operation of my improvement, what I claim as of my invention is—

The combination and arrangement of the propeller $b$, shafts $c$ and $d$, packing-box $i$, wheels $g$, $h$, and $j$, head-block $n$, tiller-ropes $m$ and $o$, and tiller-wheel P, the whole being combined and arranged substantially as herein described, and for the purpose set forth.

ROBT. H. LECKY.

Witnesses:
JAMES J. JOHNSTON,
ALEXANDER HAYS.